United States Patent [19]
Beals et al.

[11] Patent Number: 5,769,557
[45] Date of Patent: Jun. 23, 1998

[54] SEALED PIN JOINT ASSEMBLY

[75] Inventors: Charles E. Beals, Batavia; Timothy A. Vik, Sparland, both of Ill.

[73] Assignee: Caterpillar Inc., Peoria, Ill.

[21] Appl. No.: 678,798

[22] Filed: Jul. 12, 1996

[51] Int. Cl.$^6$ .................................................... F16C 11/02
[52] U.S. Cl. .......................... 403/162; 403/157; 403/288; 403/39
[58] Field of Search ............................... 403/37–40, 288, 403/163, 161, 162, 157, 34; 414/723, 715, 698

[56] References Cited

U.S. PATENT DOCUMENTS

| | | | |
|---|---|---|---|
| 3,698,750 | 10/1972 | Eastcott et al. | 403/39 X |
| 4,096,957 | 6/1978 | Iverson et al. | 403/157 X |
| 4,251,182 | 2/1981 | Schroeder | 414/723 |
| 4,398,862 | 8/1983 | Schroeder | 414/723 |
| 4,772,150 | 9/1988 | Horton | 403/39 |
| 4,961,667 | 10/1990 | Reinsma et al. | 403/11 |
| 5,044,812 | 9/1991 | Ardelt et al. | 403/162 X |

FOREIGN PATENT DOCUMENTS

WO 82/00181  1/1982  WIPO ...................................... 403/38

*Primary Examiner*—Anthony Knight
*Attorney, Agent, or Firm*—Diana L. Charlton; William C. Perry

[57] ABSTRACT

Past pin joint assemblies attaching a lift arm to a construction machine have utilized grease lubricated pins. Deflection of the pins during operation caused damage to both the pin and surrounding structure. Additionally, the use of grease requires daily lubrication schedules. The present invention overcomes these and other problems by providing an oil sealed pin joint assembly which virtual eliminates daily lubrication needs. A pin is utilized with a variable profile including first and second end portions which diverge inwardly from a first predetermined diameter and terminate at a second predetermined diameter. The second diameter is in substantial axial alignment with a contact surface of a first and second collar with first and second bearing assemblies, respectively. The pin diverges outwardly from the second diameter and terminates at a third predetermined diameter. A plurality of radii blendingly interconnect the first, second and third diameters. During operation, the pin deflects and the relative location and size of the diameters and radii promotes a uniform distribution of forces across the pin and into the surrounding structure. Uniform distribution of pin forces cause less damage to the pin and surrounding structure.

23 Claims, 3 Drawing Sheets

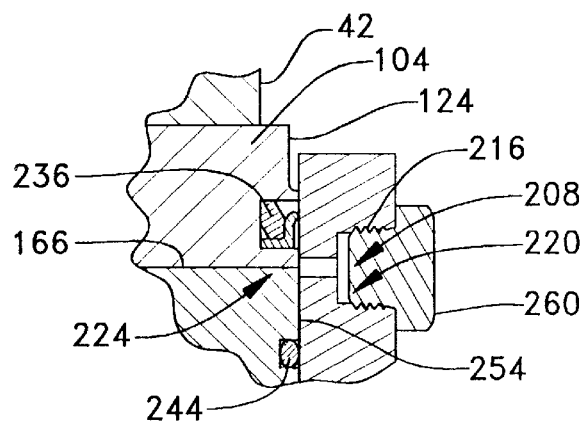
Fig_3_
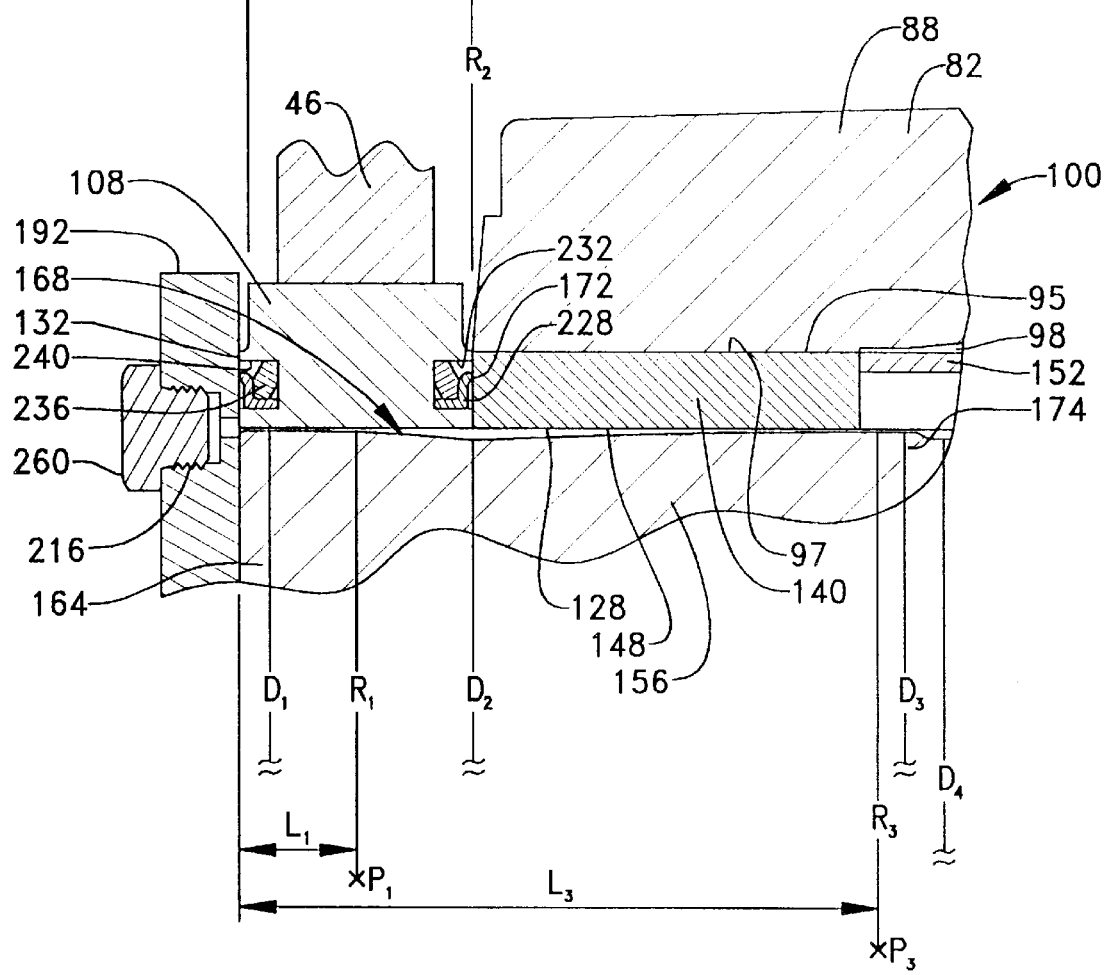
Fig_4_

SEALED PIN JOINT ASSEMBLY

TECHNICAL FIELD

This invention relates generally to pin joints and more particularly to the use of a variable pin profile within an oil sealed pin joint.

BACKGROUND ART

In construction machines with material handling capabilities, such as, wheel loaders, backhoe loaders and the like, it is well known to utilize a pin joint for attaching the lift arm or boom to the frame of the machine for utilization of a bucket or other implement. Generally, pin joints used for this function create forces on surrounding structure due to the relative movement of the lift arm or boom around the pin. Additionally, the pin may be deflected into point contact with the surrounding structure in such a manner that the pin is damaged. Managing the damaging effects of these forces and pin deflection usually requires the use of longer length to diameter bearing assemblies and larger pin diameters. Furthermore, joints must be lubricated at regular intervals in order to protect the pin joint from damage. Unfortunately, the lubrication of the pin joint must be completed every few hours during operation which requires the time and energy of the operator. The operator also has the burden of maintaining this lubrication schedule without fail because of the potential harm which may occur to the machine.

The present invention is directed to overcoming the problems as set forth above.

DISCLOSURE OF THE INVENTION

In one aspect of the present invention, a pin joint assembly comprises a frame with first and second end portions. The first and second end portions each have a bore therethrough. A member is included which has first and second end portions. A first collar is disposed within the bore of the first end portion of the frame. A second collar is disposed within the bore of the second end portion of the frame. Each collar has a bore therethrough. A first bearing assembly is connected to the first end portion of the member. A second bearing assembly is connected to the second end portion of the member. The first bearing assembly is adjacent the first collar and the second bearing assembly is adjacent the second collar. Each bearing assembly has a bore therethrough which is in substantial axial alignment with the respective bore in the respective collar. A pin extends through the bores in the collars and the bearing assemblies and connects the member to the frame. The pin has first and second ends which diverge inwardly at an outer surface from a first predetermined diameter and terminate at a second predetermined diameter at a predetermined location relative to the respective collar and respective bearing assemblies. The first and second ends of the pin diverge outwardly at the outer surface from the predetermined position to establish a third predetermined diameter.

In another aspect of the present invention, a construction machine comprises a frame with first and second end portions. The first end portion has spaced first and second side wall portions. Each side wall portion has a bore therethrough. A lift arm assembly is included which has first and second end portions. A first collar is disposed within the bore in the first side wall portion of the frame. A second collar is disposed within the bore of the second side wall portion of the frame. Each collar has a bore therethrough. A first bearing assembly is disposed within the first end portion of the lift arm assembly. A second bearing assembly is disposed within the second end portion of the lift arm assembly. The first bearing assembly is adjacent the first collar and the second bearing assembly is adjacent the second collar. Each bearing assembly has a bore therethrough which is in substantial axial alignment with the respective bore in the respective collar. A pin extends through the bores in the collars and the bearing assemblies and connects the lift arm assembly to the frame to establish a pin joint assembly. The pin has first and second ends which diverge inwardly at an outer surface from a first predetermined diameter and terminate at a second predetermined diameter at a predetermined location relative to the respective collars and respective bearing assemblies. The first and second ends of the pin diverge outwardly at the outer surface from the predetermined position to establish a third predetermined diameter.

The present invention, utilizes a pin with a variable profile in a pin joint assembly. The utilization of the variably profiled pin promotes uniform distribution of pin forces on the surrounding bearing assemblies and structure.

BRIEF DESCRIPTION OF THE DRAWINGS

FIG. 3 is an enlarged view of a seal assembly within the pin joint assembly which is taken around line 3—3 in FIG. 2; and FIG. 4 is an enlarged view of the pin joint featuring the relationship between the pin profile and the bearing assembly taken around line 4—4 in FIG. 2.

BEST MODE FOR CARRYING OUT THE INVENTION

Figure 1:
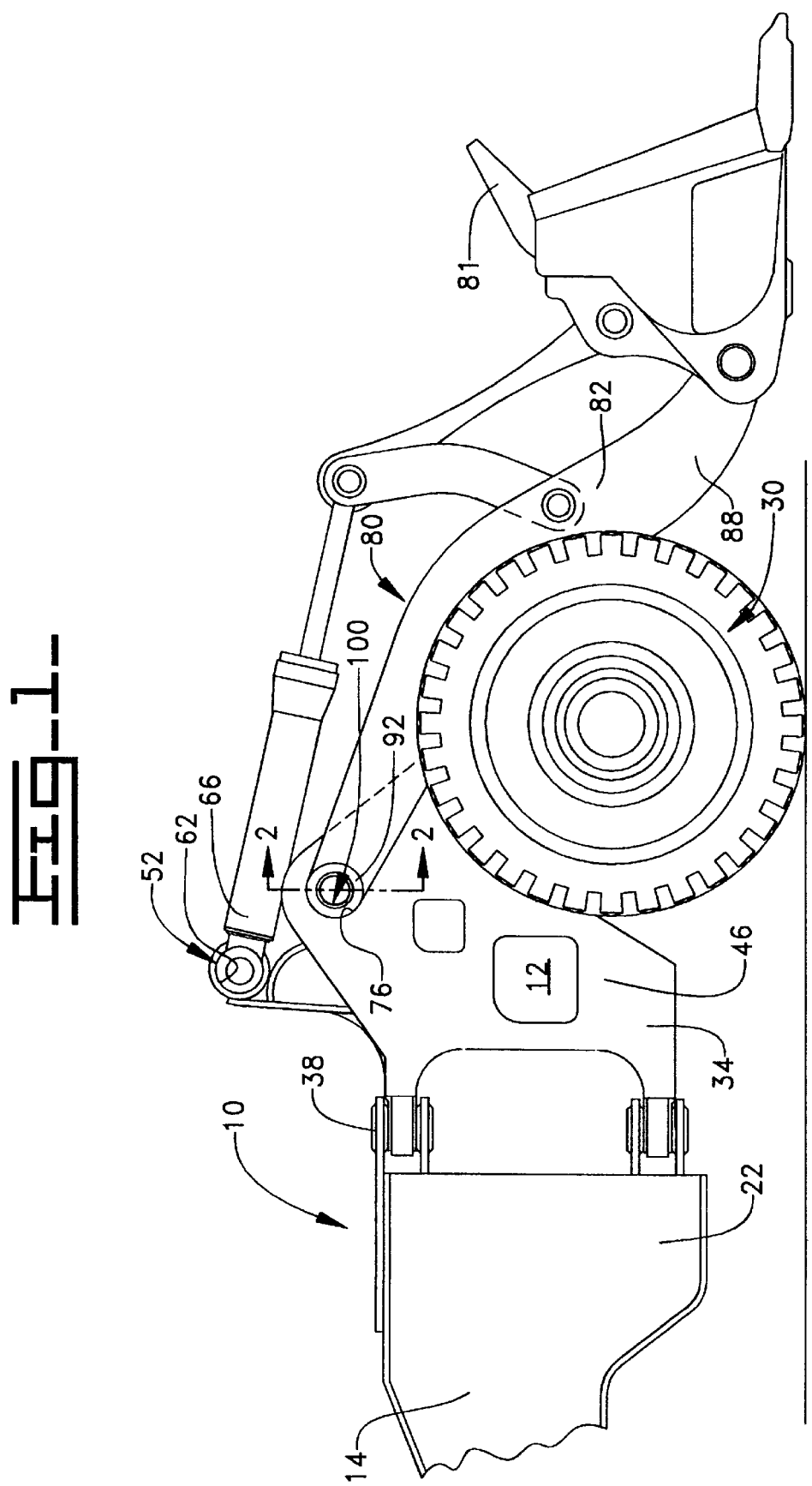
FIG. 1 is a diagrammatic view of a construction machine featuring a lift arm assembly embodying the present invention.

A construction machine, such as a wheel loader 10, is shown in FIG. 1. It should be known and understood that although a wheel loader 10 is used and described herein that any material handling machine may be utilized for the invention hereinafter described. The wheel loader 10 has a structural frame 14 with a front portion 12 and a rear portion 22. An operator's cab (not shown) is attached to the frame 14 in any well-known manner between the front portion 12 and the rear portion 22. A plurality of wheels, one of which is shown at 30, is connected to the front portion 12 and the rear portion 22 of the frame 14 through a pair of axles (not shown).

A hitch assembly 34 is connected to the front portion 12 of the frame 14 through a plurality of pins, one of which is shown at 38. The hitch assembly 34 has spaced first and second side walls portions 42,46. The first and second side wall portions 42,46 each have a plurality of bores 50 therethrough with each bore on the first side wall portion 42 being in axial alignment with a respective bore on the second side wall portion 46. The plurality of axially aligned bores 50 includes a pair of lift cylinder bores (not shown) for mounting a lift cylinder (not shown) to the hitch assembly 34, a pair of tilt cylinder bores, one of which is shown at 62, for mounting a tilt cylinder 66 to the hitch assembly 34 and a pair of pin joint bores 72,76 for pivotably mounting a lift arm assembly 80 to the hitch assembly. The lift arm assembly 80 is fixedly connected to the hitch assembly 34 through the lift cylinder (not shown) and the tilt cylinder 66 to provide the means to raise, lower and angle an implement attached thereto, such as a bucket 81, through the pivotal mounting about the pin joint bores 72,76 during loading and unloading. The lift arm assembly 80 includes a lift arm 82 which has first and second side wall portions 84,88 positioned between the first and second side wall portions 42,46 of the hitch assembly 34. The first and second side portions 84,88 of the lift arm 82 form a cylindrical end portion 92 at an opposite end to the bucket 81 with a pair of spaced extended fingers 94,95 with internal bores 96,97, respectively, therethrough. A space 98 of a predetermined width is defined between the fingers 94,95. A pin joint assembly 100 is used to pivotally mount the lift arm 82 within the pin joint bores 72,76.

Figure 2:
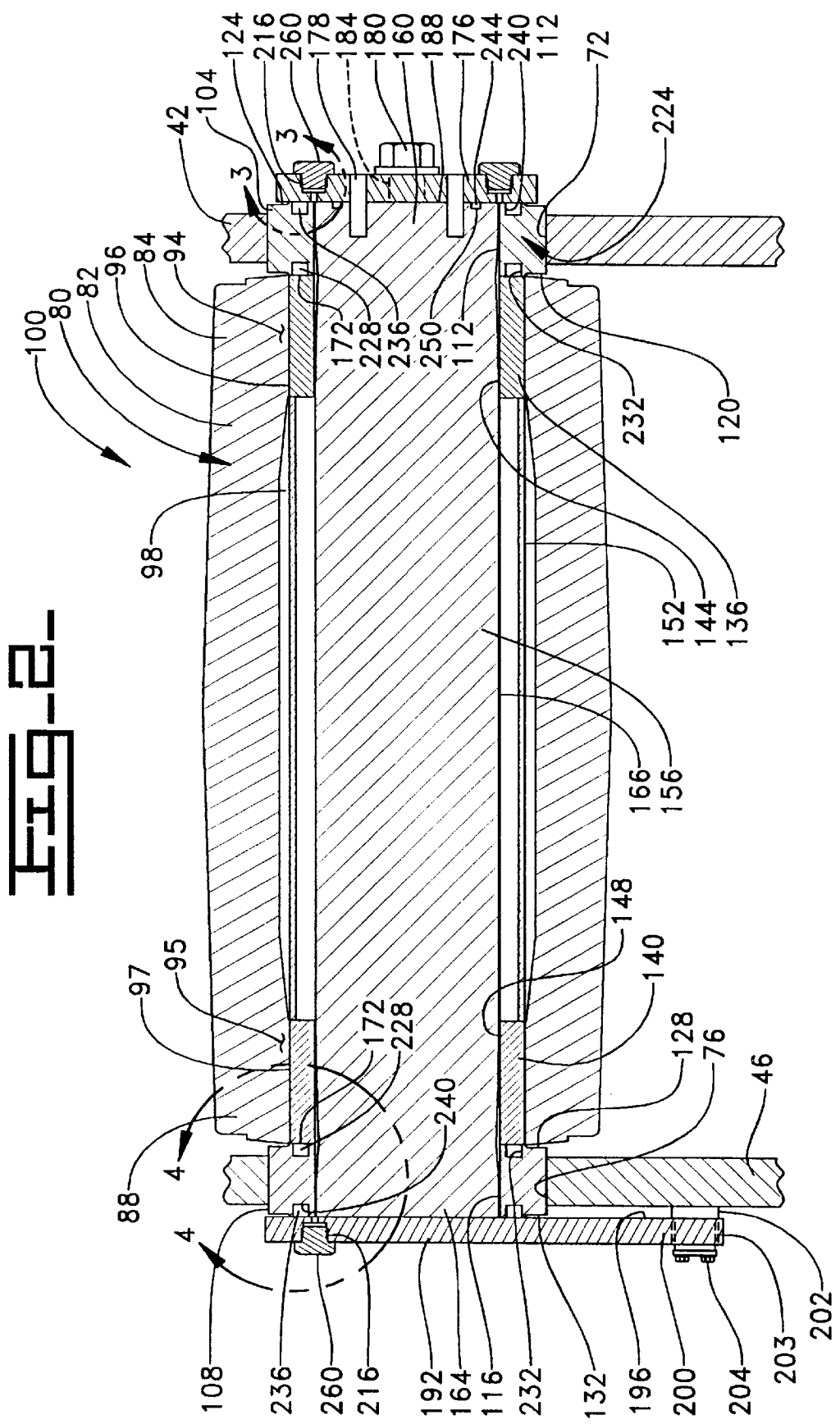
FIG. 2 is a diagrammatic view of a pin joint assembly taken along line 2—2 of FIG. 1.

The pin joint assembly 100, which can be seen more clearly in FIGS. 2–4, includes first and second collars 104,108 fitted within the pin joint bores 72,76, respectively, in any suitable manner, such as a loose press fit. The first collar 104 has a first collar bore 112 therethrough and the second collar 108 has a second collar bore 116 therethrough substantially axially aligned with the first collar bore 112. The first and second collars 104,108 each have inner and outer surfaces 120,124,128,132 thereon. The first and second collars 104,108 have a width within the range of 69.975 mm to 70.025 mm (2.755 in to 2.757 in). First and second bearing assemblies 136,140 are fitted as by press-fit or other well known manner within the internal bores 96,97 of the fingers 94,95 of the first and second side wall portions 84,88 of the lift arm 82. The first and second bearing assemblies 136,140 have a width within the range of 129.975 mm–130.025 mm (5.117 in to 5.119). The first bearing assembly 136 has a first bore 144 therethrough and the second bearing assembly 140 has a second bore 148 therethrough substantially axially aligned with the first bore 144 in the first bearing assembly 136. The first and second bearing assembly bores 144,148 are substantially axially aligned with the first and second collar bores 112,116. A spacer 152 is positioned between the first and second bearing assemblies within the space 98 defined by the fingers 94,95. A pin 156 extends through the first and second collar bores 112,116, the first and second bearing assembly bores 144,148 and the spacer 152. A fixed relationship is established between the pin 156 and the first and second collar bores 112,116 and a rotatable relationship is established between the pin 156 and the first and second bearing assemblies 136,140 and the spacer 152.

The pin 156 has first and second end portions 160,164 terminating at the outer surfaces 124,132 of the first and second collars 104,108, respectively. The pin 156 has an outer surface 166 with a variable profile 168, as can be seen more clearly in FIG. 4. The outer surface 166 of the first and second end portions 160,164 diverge inwardly both axially and radially from the outer surface established by a first diameter D1 ranging approximately from 179.800 mm to 179.850 (7.079 in to 7.081 in) and terminate at a surface established by a second diameter D2 ranging approximately from 179.035 mm to 179.085 mm (7.049 in to 7.051 in). The second diameter D2 is located in substantial radial alignment with a contact surface 172 between the first and second collars 104,108 and the first and second bearing assemblies 136,140, respectively. The first and second end portions 160,164 of pin 156 diverge outwardly from the surface established by the second diameter D2 and terminate at a surface established by a third diameter D3 ranging approximately from 179.800 mm to 179.850 mm (7.079 in to 7.081 in). A first radius R1 is defined at a first point P1 approximately 4000 mm inwardly from the outer surface 166 of the pin 156 and approximately 15.5 mm to 20.5 mm inwardly at a predetermined location L1 from the first and second end portions 160,164. A second radius R2 is defined at a second point P2 approximately 200 mm radially outwardly from the outer surface 166 of the pin 156 and approximately 69.5 mm to 70.5 mm axially inwardly at a predetermined location L2 from the first and second end portions 160,164. A third radius R3 extends from a third point P3 approximately 25,200 mm axially radially inwardly from the outer surface 166 of the pin 156 and approximately 209.55 mm to 210.5 mm inwardly at a predetermined location L3 from the first and second end portions 160,164. The first radius R1 is tangent to the cylindrical surface established by the first diameter D1 to blendingly connect with the surface established by the second radius R2. The third surface established by the radius R3 is tangent to the surface established by the third diameter D3 to blendingly connect with the surface established by the second radius R2. The second radius R2 allows the first radius R1 and the third radius R3 to blendingly connect. A surface established by the central portion 174 of the pin 156 is tapered radially inwardly from the surface established by the third diameter D3 to a surface established by a fourth diameter D4 approximately 178.75 mm to 179.75 mm (7.037 in to 7.077 in).

It should be understood that the diameters D1,D2,D3, radii R1,R2,R3 and locations L1,L2,L3 may have different ranges based upon the size of the machine and the manufacturing or assembly requirements.

A first plate 176 is located on the first end portion 164 of the pin 156 by a plurality of dowel pins, one of which is shown at 178. The first plate is connected to the pin 156 by a bolt 180 threaded into a threaded bore 184 therein. The first plate 176 has an inner surface 188. A portion of the inner surface 188 of the first plate 176 is adjacent the outer surface 124 of the first collar 104. A second plate 192 is connected to the second end portion 164 of the pin 156 by any suitable manner, such as by circumferentially welding the second plate 192 to the pin 156. The second plate 192 has an inner surface 196. A portion of the inner surface 196 of the second plate 192 is adjacent the outer surface 132 of the second collar 108. The second plate 192 has an extended leg portion 200 which is connected to the hitch assembly 34 through a block 202 welded onto the hitch assembly 34. The block 202 has a slot 203 therein in which the extended leg portion 200 is seated. A pair of mounting bolts, one of which is shown at 204, connect the extended leg portion 200 to the block 202.

A means 208 for introducing lubricating fluid, preferably oil, into the pin joint assembly 100 at the outer surface 166 of the pin 156 as is shown in FIG. 3. The introducing means 208 includes a threaded lubrication bore 216, in which is positioned an oil zerk, that extends through each of the first and second plates 176,192 to define a communication means 220 between an external oil supply (not shown) and the outer surface 166 of the pin 156.

A means 224 for sealing the lubricating fluid within the pin joint assembly 100 after introduction at the outer surface 166 of the pin 156 is shown in FIG. 3. The sealing means 224 includes a first seal 228 of any suitable type, such as a face seal, is disposed within a inner groove 232 located on the inner surfaces 120,128 of the first and second collars 104,108 for sealing between the first and second collars 104,108 and the first and second bearing assemblies 136, 140, respectively. A second seal 236 of any suitable type, such as a face seal, is disposed within an outer groove 240 located on the outer surfaces 124,132 of the first and second collars 104,108 for sealing between the first and second collars 104,108 and the first and second plates 176,192, respectively. A third seal 244 of any suitable type, such as an o-ring seal, is disposed within a o-ring groove 250 located on the first end portion 160 at an end surface 254 of the pin 156 for sealing between the first plate 176 and an internal portion (not shown) of the pin 156. A plug 260 is threaded into the threaded lubrication bores 216 in the first and second plates 176,192 to block communication between the lubricated fluid surrounding the outer surface 166 of the pin 156 and the atmosphere.

Industrial Applicability

The plugs 260 in the first or second plates 176,192 are removed in order to introduce oil from an external lubricating fluid source (not shown) onto the outer surface 166 of the pin 156 in a well-known manner and into the space 98. The space 98 acts as a self-contained oil reservoir. Once an adequate amount of oil has been added to the pin joint assembly 100 at the outer surface 166 of the pin 156 and within the space 98, the plugs 260 are threaded back into the lubrication bores 216 to prevent oil from leaking into the atmosphere.

During operation of the machine 10, the pin is restricted from moving axially and is restricted from rotating in relation to the hitch assembly 34 due to the connection of the extended leg portion 200 with the hitch assembly 34 through the block 202. However, the lift arm 82 pivots about the pin 156 to achieve specific movements of the bucket 81. The pivoting motion causes the pin 156 to deflect due to the forces acting primarily at the first and second end portions 160,164 of the pin 156 in close proximity to diameter D1 and in close proximity to diameter D3. Deflection occurs throughout the length of the pin 156. This deflection causes the pin 156 to move into substantial line contact with the first and second collars 104,108 and the first and second bearing assemblies 136,140 establishing a more uniform distribution of forces. The relative diameters D1,D2,D3 and their respective locations promote the uniform distribution. The relative position and size of the radii R1,R2,R3 distribute the forces more efficiently across the outer surface 166 of the pin 156 substantially eliminating gouging of the pin 156 by the first and second collars 104,108 and the first and second bearing assemblies 136,140. Consequently, the radii R1,R2,R3 distribute the forces more efficiently into the surrounding structure.

The first and second face seals 224,236 prevent oil within the pin joint assembly 100 from escaping through the first and second collars 104,108 and the first and second bearing assemblies 136,140. The o-ring seal 244 prevents oil from escaping past the threaded bore 184 and into the atmosphere.

It should be understood that the ability to utilize oil within the pin joint assembly 100 increases the load and energy capability of the system due to the improved lubrication at the bearing assembly 136,140 and pin 156 interface. The improved lubrication, in turn, allows for the use of shorter length to diameter bearing assemblies 136,140. Shorter length to diameter bearing assemblies 136,140 reduce the bending moments generated in the pin 156. A reduction in the generated bending moments allows for the utilization of a smaller diameter pin 156. The smaller diameter pin 156 with a variable profile 168 achieves a more uniform distribution of pin forces eliminating potential gouging problems and the need for additional structural members. Additionally, sealing the oil within the pin joint assembly 100 virtually eliminates daily lubrication requirements.

Other aspects, objects, and advantages of this invention can be obtained from a study of the drawings, the disclosure and the appended claims.

What is claimed is:

1. A pin joint assembly, comprising:
    a frame having first and second end portions, each of the first and second end portions having a bore therethrough;
    a member having first and second end portions;
    a first collar disposed within the bore of the first end portion of the frame and a second collar disposed within the bore of the second end portion of the frame with each collar having a bore therethrough;
    a first bearing assembly connected to the first end portion of the member and a second bearing assembly connected to the second end portion of the member with the first bearing assembly being adjacent the first collar and the second bearing assembly being adjacent the second collar, each bearing assembly having a bore therethrough in substantial axial alignment with the respective bore in the respective collar; and
    a pin extending through the bores in the collars and the bearing assemblies for connecting the member to the frame, the pin having first and second ends, each of which diverges radially and axially diverging inwardly from a cylindrical outer surface having a first predetermined diameter and terminating at a surface having a second predetermined diameter at a predetermined location relative to the respective collars and respective bearing assemblies and diverging radially outwardly and axially inwardly at the outer surface established at the predetermined position to establish a surface having a third predetermined diameter at an axially inner location from said predetermined location.

2. The pin joint assembly of claim 1, wherein the member is positioned between the first and second end portions of the frame and a spacer surrounds the pin and is positioned between the first and the second bearing assemblies.

3. The pin joint assembly of claim 2, including means for introducing lubricating fluid into the pin joint assembly at an outer surface of the pin and for sealing the lubricating fluid within the pin joint assembly after introduction therein.

4. The pin joint assembly of claim 3, wherein the first and the second collars each have an inner surface and an outer surface with the means for sealing having first sealing means disposed within the inner surface of the first and second collars for sealing between the first and second collars and the respective first and second bearing assemblies.

5. The pin joint assembly of claim 4, including a first plate connected at the first end of the pin adjacent the outer surface of the first collar and a second plate connected to the second end of the pin adjacent the outer surface of the second collar.

6. The pin joint assembly of claim 5, wherein the means for sealing includes a second sealing means disposed with the outer surface of the first and second collars for sealing between the first and second collars and the respective first and second plates.

7. The pin joint assembly of claim 6, wherein the means for sealing includes third sealing means disposed within the first end of the pin for sealing between the pin and the first plate.

8. The pin joint assembly of claim 5, wherein the second plate has an extended leg portion which is connected to the second end portion of the frame.

9. The pin joint assembly of claim 5, wherein the introducing means includes the first and the second plate each having a lubrication bore therethrough which provides fluid communication between the pin and an external lubricated fluid source.

10. The pin joint assembly of claim 5, wherein the first plate is bolted to the first end of the pin and the second plate is welded to the second end of the pin.

11. The pin joint assembly of claim 9, wherein a portion of the lubrication bores of the first and the second plates is threaded and a plug is threadably received within each of the first and second plates to block communication between the pin and the atmosphere.

12. The pin joint assembly of claim 1, wherein the first predetermined diameter is within the range from 179.800 to 179.850 mm, the second predetermined diameter is within the range from 179.035 mm to 179.085 mm, and the third predetermined diameter is within the range from 179.800 mm to 179.850 mm.

13. The pin joint assembly of claim 1, wherein the predetermined position of the second predetermined diameter is substantially radially aligned with the inner surface of the respective first and second collar.

14. The pin joint assembly of claim 1, wherein the first and the second collars each have a predetermined width within the range of 69.075 mm to 70.025 mm and the first and the second bearing assemblies each have a predetermined width within the range of 129.075 mm to 130.025 mm.

15. The pin joint assembly of claim 1, wherein the outer surface of the pin has a plurality of radii at predetermined locations from the first and second end portions of the pin which blendingly interconnect the first, second and third diameters.

16. A construction machine, comprising:
a frame having first and second end portions, the first end portion having spaced first and second side wall portions with each side wall portion having a bore therethrough;
a lift arm assembly having first and second end portions;
a first collar disposed within the bore in the first side wall portion of the frame and a second collar disposed within the bore of the second side wall portion of the frame with each collar having a bore therethrough;
a first bearing assembly disposed within the first end portion of the lift arm assembly and a second bearing assembly disposed within the second end portion of the lift arm assembly with the first bearing assembly being adjacent the first collar and the second bearing assembly being adjacent the second collar, each bearing assembly having a bore therethrough in substantial axial alignment with the respective bore in the respective collar; and
a pin extending through the bores in the collars and the bearing assemblies for connecting the lift arm assembly to the frame to establish a pin joint assembly, the pin having first and second ends that diverge radially and axially inwardly from a cylindrical outer surface having a first predetermined diameter and terminating at a surface having a second predetermined diameter at a predetermined axial location relative to the respective collars and respective bearing assemblies and diverging radially outwardly and axially inwardly at the outer surface established at the predetermined position to establish a surface having a third predetermined diameter at an axially inner location from said predetermined location.

17. The construction machine of claim 16, wherein the lift arm assembly is positioned between the first and second side wall portions of the frame and the first and the second bearing assemblies are press fit into the respective first and second end portion of the lift arm assembly between the lift arm assembly and the pin for rotation of the lift arm assembly about the pin.

18. The construction machine of claim 17, wherein a spacer is positioned between the first and second bearing assemblies between the lift arm assembly and the pin.

19. The construction machine of claim 18, including a first plate connected at the first end of the pin adjacent the outer surface of the first collar and a second plate connected to the second end of the pin adjacent the outer surface of the second collar.

20. The construction machine of claim 19, including means for introducing lubricating fluid into the pin joint assembly at an outer surface of the pin and for sealing the lubricating fluid within the pin joint assembly after introduction therein.

21. The construction machine of claim 20, wherein the introducing means includes the first and the second plates each having a lubrication bore therethrough which provides fluid communication between the pin and an external lubricated fluid source, the lubrication bores having a threaded portion therein.

22. The construction machine of claim 20, wherein the sealing means includes a first seal between the first plate and the first collar, a second seal between the first collar and the first bearing assembly, a third seal between the second bearing assembly and the second collar, a fourth seal between the second collar and the second plate, a fifth seal between the first plate and the pin, and a plug threadably received within the threaded portion of the bores of the first and second plates.

23. The construction machine of claim 20, wherein the outer surface of the pin has a plurality of radii at predetermined locations from the first and second end portions of the pin which blendingly interconnect the first, second and third diameters.

* * * * *